(12) United States Patent
Seyedi et al.

(10) Patent No.: US 11,005,566 B1
(45) Date of Patent: May 11, 2021

(54) WAVELENGTH MODULATION TO IMPROVE OPTICAL LINK BIT ERROR RATE

(71) Applicant: HEWLETT PACKARD ENTERPRISE DEVELOPMENT LP, Houston, TX (US)

(72) Inventors: Mir Ashkan Seyedi, Palo Alto, CA (US); Terrel Morris, Garland, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/874,267

(22) Filed: May 14, 2020

(51) Int. Cl.
*H04B 10/00* (2013.01)
*H04B 10/275* (2013.01)
*H04B 10/40* (2013.01)

(52) U.S. Cl.
CPC ........... *H04B 10/275* (2013.01); *H04B 10/40* (2013.01)

(58) Field of Classification Search
CPC .............................. H04B 10/275; H04B 10/40
USPC ............................................................ 398/58
See application file for complete search history.

(56) References Cited

U.S. PATENT DOCUMENTS

| 7,116,861 | B2 | 10/2006 | Welch et al. | |
|---|---|---|---|---|
| 9,780,870 | B1 | 10/2017 | Zortman et al. | |
| 10,027,089 | B2 | 7/2018 | Liang | |
| 2006/0222038 | A1 | 10/2006 | Yamazaki | |
| 2013/0183044 | A1* | 7/2013 | Stone | H04B 10/40 398/139 |
| 2017/0026175 | A1* | 1/2017 | Zhang | H04L 9/0855 |
| 2018/0249555 | A1* | 8/2018 | Sugiyama | H01S 5/0687 |

OTHER PUBLICATIONS

Rakhshani, M. R. et al.; "Realization of Tunable Optical Filter by Photonic Crystal Ring Resonators"; Optik; Mar. 21, 2013; pp. 5377-5380; vol. 124; Elsevier GmbH.

* cited by examiner

*Primary Examiner* — Mohammad R Sedighian
(74) *Attorney, Agent, or Firm* — Sheppard Mullin Richter & Hampton LLP

(57) ABSTRACT

An optical transceiver module includes an optical transceiver and a controller. The optical transceiver has a ring filter configured to transmit optical signals from or receive optical signals for the optical transceiver module. The controller is configured to: detect a carrier frequency at the optical transceiver; detect a data signal frequency of data at the optical transceiver; determine a bit error rate of the data; and in response to determining that the bit error rate of the data is greater than a threshold, periodically vary a central wavelength of the ring filter at a frequency at least three orders slower than the data signal frequency.

20 Claims, 8 Drawing Sheets

Prior Art

WAVELENGTH MODULATION TO IMPROVE OPTICAL LINK BIT ERROR RATE

DESCRIPTION OF RELATED ART

An optical network generally includes an optical transmitter, an optical receiver, and an optical fiber connected therebetween. Signal transmissions between nodes of the optical network may be impeded due to errors at transmitters, receivers, and/or optical cables. The errors can be measured by a bit error rate as an indication of how reliable the signal transmissions in the network are.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Disclosed is an optical communication network. The optical interconnects in the optical communication network may have a carrier frequency that is, for example, in the 200 THz range, using a 1310 nm wavelength light source. A gigahertz level data rate can then be encoded onto the carrier signal. In this example, the carrier frequency and data signal frequency are three orders of magnitude apart.

The optical interconnects may be implemented with ring resonators/filters. For example, a ring filter may be disposed at the receiver to demultiplex an incoming signal. This signal is then routed to a photodetector that is at the drop port of the 4-port ring filter/resonator. This approach results in the spectral filtering that is caused by the drop port. The spectral filtering causes reduced rise/fall time in the output port, thus increasing bit error rate (BER). The techniques disclosed herein may ameliorate this disadvantage, as described below.

Figure 1:
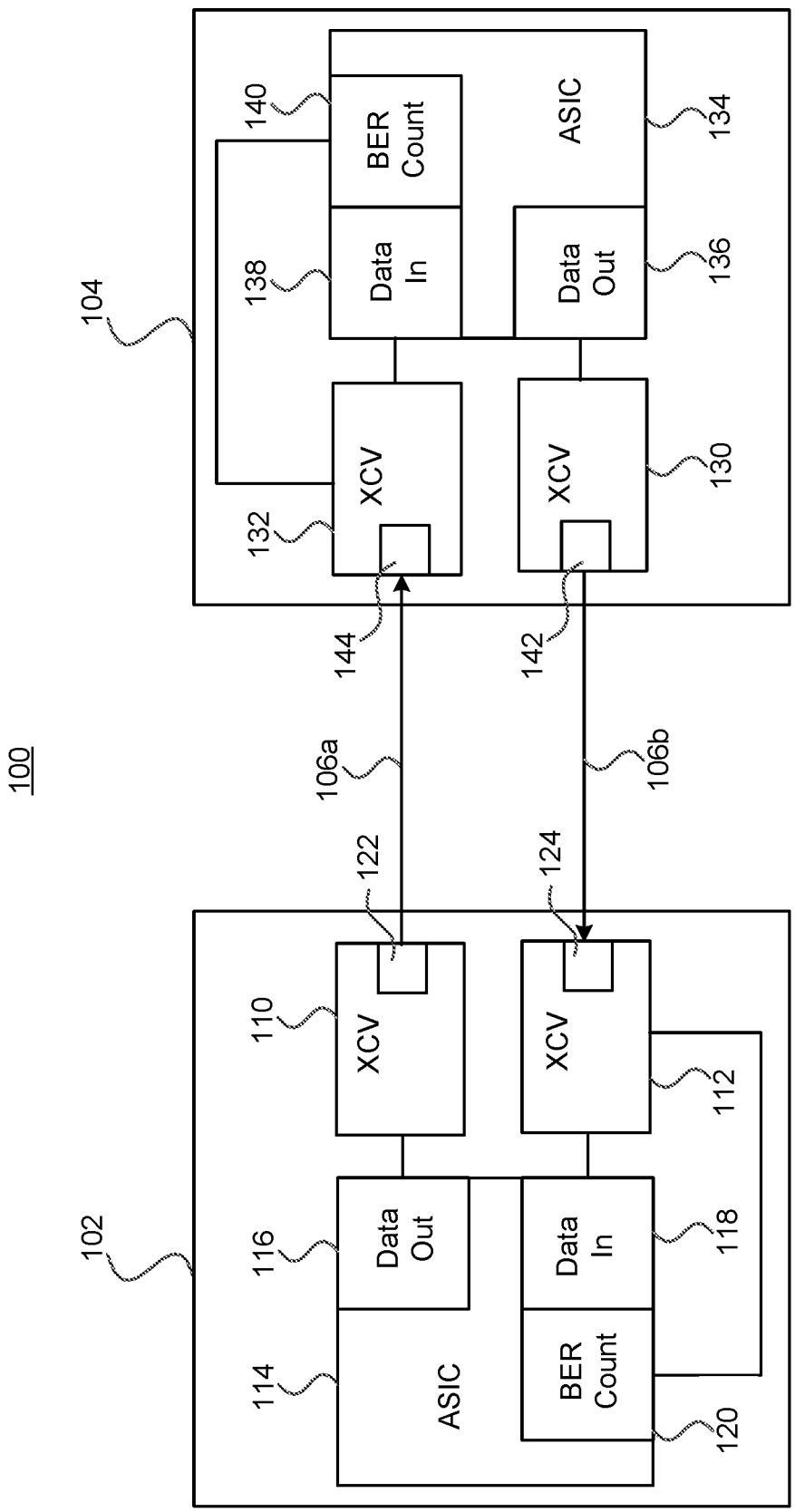
FIG. 1 is a block diagram illustrating an optical communication network configured to implement techniques for reducing bit error rates, according to one embodiment.

Reference is now made to FIG. 1. FIG. 1 illustrates an optical communication network 100 that includes two or more nodes. A topography of the optical communication network 100 may be one-to-one, one-to-many, or many-to-many. In the illustrated example, the optical communication network 100 includes a first node 102 and a second node 104. The first node 102 and the second node 104 are lined with optical cables 106a, 106b. Although shown as separate cables, the optical cables 106a, 106b may be combined as a single duplex cable. Other types of cables may be employed.

The first node 102 includes transceivers (e.g., optical transceivers or optical transceiver modules "XCV") 110, 112 and an application-specific integrated circuit (ASIC) 114. The ASIC 114 includes a data output block (Data Out) 116, a data input (Data In) block 118, and a BER Count block 120. The BER Count block 120 is connected to data input transceiver 112. The transceivers 110 and 112 include ring filters 122 and 124, respectively. The data output block 116 of the ASIC 114 is configured to generate electrical signals to be transmitted by the transceiver 110. The electrical signals are converted into optical signals at the transceiver 110 and transmitted through the ring filter 122 to the second node 104 via the optical cable 106a. It is to be understood that although the transceivers 110 and 112 are shown as separate unites, in some implementations, they can be integrated as one unit. In some embodiments, each of the transceivers 110, 112 may be implemented by silicon photonic technologies.

The transceiver 112 is configured to receive optical signals through the ring filter 124 and to convert the received optical signals into electrical signals for the ASIC 114. The data input block 118 of the ASIC 114 receives the electrical signals from the transceiver 112. The data input block 118 may send the electrical signals to other functional blocks of the ASIC 114 for processing. One of such functional blocks may be the BER count block 120. The BER block 120 is configured to determine a BER for the received signals. For example, a count for bit errors in received digital signals over a period of, e.g., 1000 bits may be collected to determine the BER. When the BER is greater than a threshold, the BER count block 120 is configured to generate and send a control signal to the transceiver 112 to vary a central wavelength of the ring filter 124. In some embodiments, the threshold may be determined based on whether a forward error correction (FEC) is employed in the network. For example, the threshold may be about $10^{-5}$ when the FEC is employed or about $10^{-10}$ to $10^{-14}$ when the FEC is not implemented in the network. Once the BER count block 120 determines that the BER of the incoming signals is greater than a threshold, the BER count block 120 may provide a control signal to the transceiver 112 to periodically vary a central wavelength of the ring filter 124. For example, the BER count block 120 may provide the control signal to the transceiver 112 at a frequency of 1 kHz to several MHz. The central wavelength of the ring filter 124 may be varied based on a data signal frequency of incoming data signals. In some embodiments, the central wavelength of the ring filter 124 may be varied at a frequency at least three orders slower than the data signal frequency.

Similarly, the second node 104 includes transceivers 130, 132 (e.g., optical transceivers or optical transceiver modules "XCV") and an ASIC 134. The ASIC 134 includes a data output block 136, a data input block 138, and a BER count block 140. The BER count block 140 is connected to the transceiver 132 at the data input end. The transceivers 130 and 132 include ring filters 142 and 144, respectively. The data output block 136 of the ASIC 134 is configured to generate electrical signals to be transmitted by the transceiver 130. The electrical signals are converted into optical signals at the transceiver 130 and transmitted through the ring filter 142 to the first node 102 via the optical cable 106b. Although the transceivers 130 and 132 are shown as separate unites, in some implementations, they can be integrated as one unit. Each of the transceivers 130, 132 may be implemented by silicon photonic technologies.

The transceiver 132 is configured to receive optical signals through the ring filter 144 and to convert the received optical signals into electrical signals for the ASIC 134. The data input block 138 of the ASIC 114 receives the electrical signals from the transceiver 132. The data input block 138 may send the electrical signals to the BER count block 140. The BER block 140 is configured to determine a BER for the received signals. When the BER is greater than a threshold, the BER count block 140 is configured to generate and send a control signal to the transceiver 132 to vary a central wavelength of the ring filter 144. For example, once the BER count block 140 determines that the BER of the incoming signals is greater than the threshold, the BER count block 140 may provide a control signal to the transceiver 132 to periodically vary a central wavelength of the ring filter 144. The central wavelength of the ring filter 144 may be varied based on a data signal frequency of incoming data signals. In some embodiments, the central wavelength of the ring filter 144 may be varied at a frequency at least three orders slower than the data signal frequency.

Figure 2A:
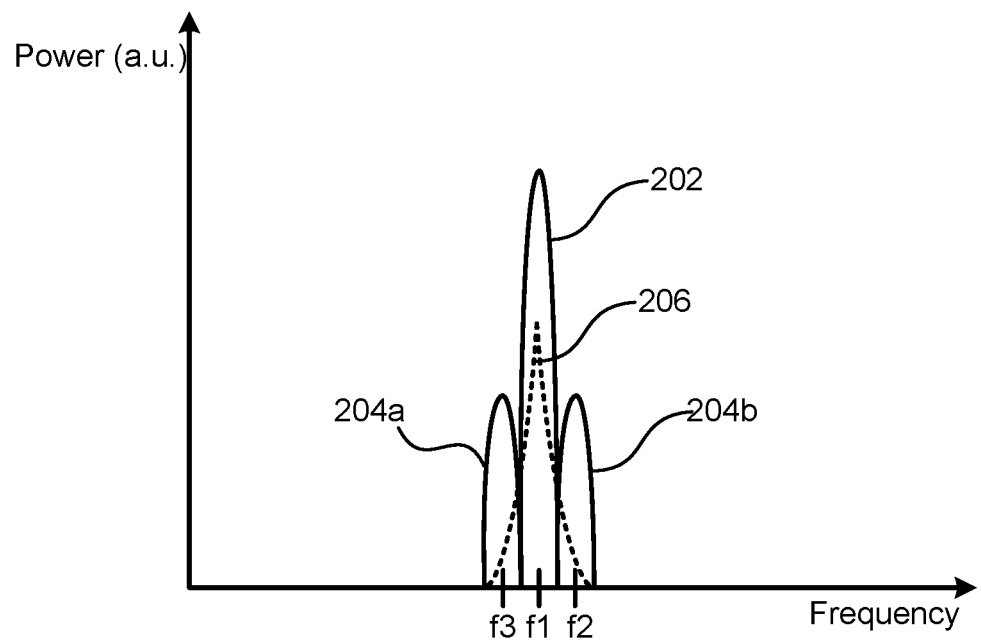
FIG. 2A is a diagram illustrating carrier and data signals (solid line) of a transmitter ring filter and a resonant signal (broken line) of a receiver ring filter of a conventional optical communication network.
Figure 2B:
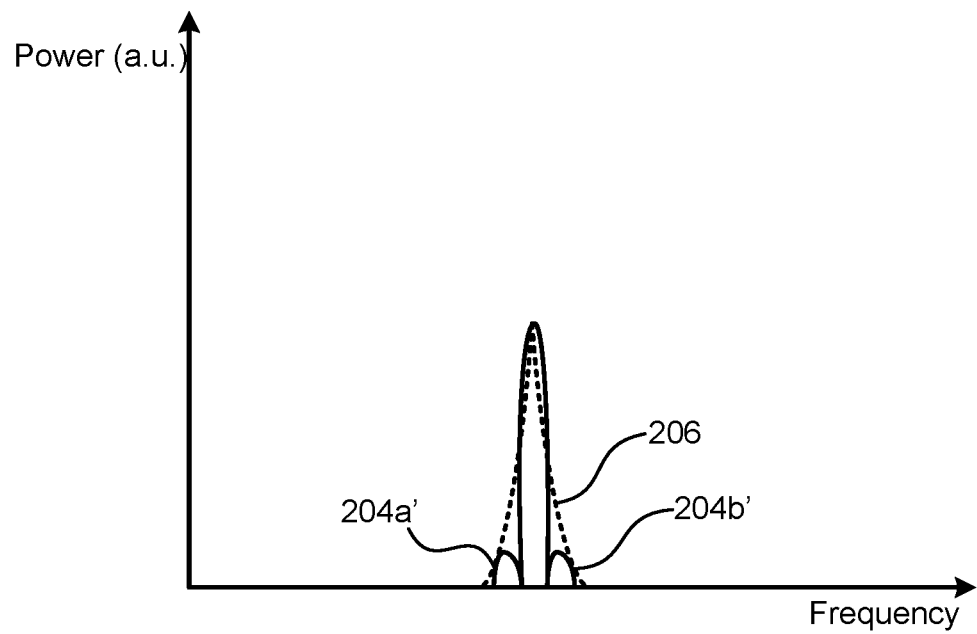
FIG. 2B is a diagram graphically illustrating spectral filtering of the conventional optical communication network of FIG. 2A.

These techniques are further illustrated with greater details hereinafter. FIG. 2A is a diagram illustrating carrier and data signals (solid line) of a transmitter ring filter and a resonant signal (broken line) of a receiver ring filter of a conventional optical communication network. A transmitter (e.g., of a transceiver 110 or 130) is configured transmit a carrier signal 202 and data signals 204a and 204b. The carrier signal 202 has a central wavelength at a frequency f1, while the data signals 204a and 204b each have a central wavelength at frequencies f2 and f3, respectively, in FIG. 2A. For example, when the carrier signal is at 2.282 THz (1310 nm) (e.g., f1) and the incoming data is modulated at 20 Gbps with the carrier signal, optical side bands may fall at 2.262 (e.g., f2) and 2.302 THz (e.g., f3). For a typical dense wavelength division modulation (DWDM) optical link, a resonant signal 206 of a receiver ring filter (e.g., ring filter 124, 144 in FIG. 1) has a full width half maximum (FWHM) of about 25 GHz. Logically, the resonant signal 206 of the receiver ring filter may function as the optical passband such that any optical signal outside of the resonant signal 206 would be heavily attenuated. In general, the FWHM of 25 GHz is selected as a function of channel spacing, which is typically on the order of 50-80 GHz. An optical passband may be selected 2-3 times less than the channel spacing. In this example, the receiver ring filter, tuned to 2.282 THz same as the carrier signal 202, would attenuate any signal outside of frequency of 2.2695-2.2945 THz (i.e., 2.282 THz±25 GHz). The optical sidebands (204a', 204b') due to modulation at 20 Gbps, namely 2.262 and 2.302 THz, are outside of the bandpass and suffers attenuation as shown in FIG. 2B.

Figure 3A:
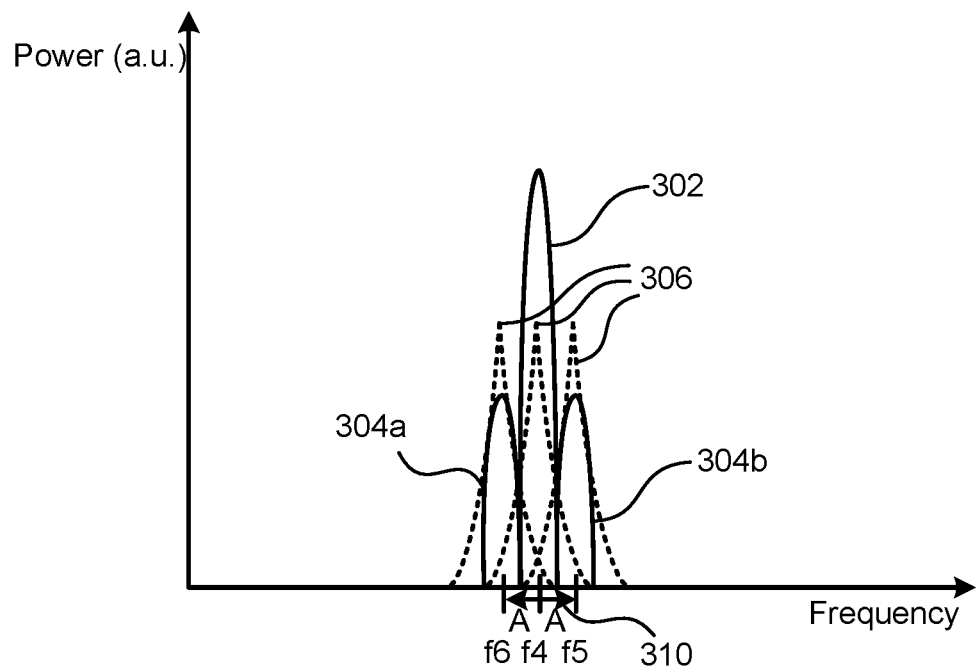
FIG. 3A is a diagram illustrating carrier and data signals (solid line) of a transmitter ring filter and resonant signals (broken line) of a receiver ring filter of an optical communication network according to one example embodiment of this disclosure.

The techniques disclosed herein allow periodically varying the central wavelength of the ring filter at the transmitter and/or the receiver such that the optical sidebands of the data signals can be received with less attenuation, which in turn may improve the bit error rate. FIG. 3A is a diagram illustrating carrier and data signals (solid line) of a transmitter ring filter and resonant signals (broken line) of a receiver ring filter of an optical communication network according to one embodiment of this disclosure. The carrier signal 302 and the data signals 304a, 304b of a transmitter (e.g., transceivers 122, 142) are shown in solid lines in FIG. 3A. The resonant signal 306 of the ring filter at a receiver (e.g., ring filter 124, 144 in FIG. 1) is shown in dotted lines. A central wavelength of the resonant signal 306 of the ring filter is varied as shown by an arrow 310 by an offset A from the center of the carrier signal 302. For example, the central wavelength of the resonant signal 306 at the receiver ring filter is initially at frequency f4, and is moved to frequency f5, back to frequency f4, and to frequency f6, and back to frequency f4, and so on.

In some implementations, the central wavelength of the resonant signal 306 is varied at a frequency at least three orders slower than the data signal frequency. For example, when the data signals are transmitted at gigahertz level, the frequency to vary the central wavelength of the resonant signal 306 may be set at kilohertz to megahertz range. This technique allows the receiver to continue receive incoming data signals without significant decay.

The central wavelength of the resonant signal 306 can be sinusoidally varied in one embodiment. In another implementation, a central wavelength of the resonant signal 306 can be varied with a control signal such as a ramp signal. For example, the control signal can move the central wavelength of the resonant signal 306 at different speeds within the offset A. While the central wavelength of the resonant signal 306 may oscillate between frequencies f4-f6, it spends less time at the center frequency f4 and more time at end frequencies f5 and f6. The central wavelength of the resonant signal 306 is moved at or around center frequency f4 at a speed greater than a speed at or around end frequencies f5 and f6. This can be achieved by a bimodal drive mechanism to minimize the time in the center (f4) and maximize time at the endpoints (f5 and f6) with an exponential-mode control algorithm. The bimodal drive mechanism may be refined with information of BER updates in the network.

Figure 3B:
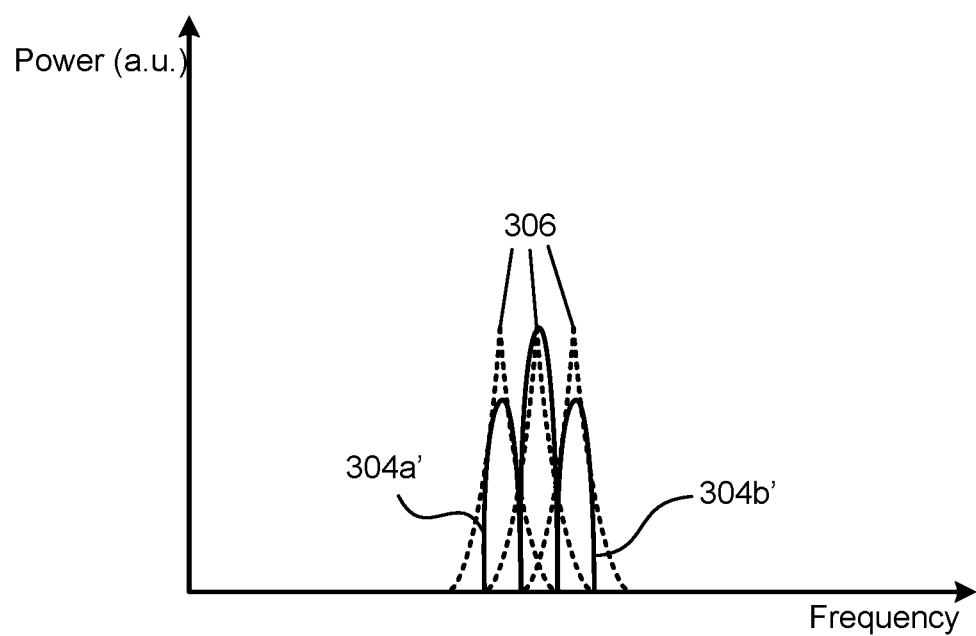
FIG. 3B is a diagram graphically illustrating spectral filtering of the optical communication network of FIG. 3A.

FIG. 3B is a diagram graphically illustrating data signals that have been modulated by the ring filter of the receiver, according to one embodiment. Because the central wavelength of the resonant signal 306 is varied, the power of the modulated data signals 304a' and 304b' are stronger than those (204a' and 204b') of FIG. 2B, improving the strength of the received data signals. This leads to lower BER for the communication network.

Figure 4A:
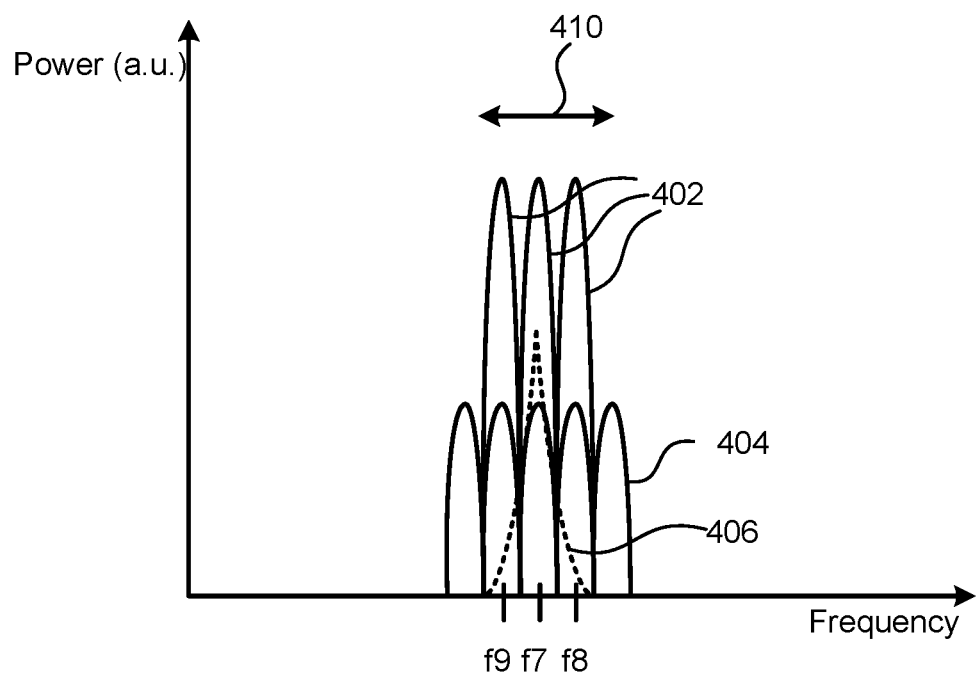
FIG. 4A is a diagram illustrating carrier and data signals (solid line) of a transmitter ring filter and a resonant signal (broken line) of a receiver ring filter of another optical transceiving mechanism according to one example embodiment of this disclosure.

In some implementations, a central wavelength of the receiver ring filter may be stationary while a central wavelength of the carrier signal of the transmitter ring filter may be varied. An example is illustrated in FIG. 4A. In FIG. 4A, a central wavelength of the carrier signal 402 on the transmitter side is initially at, for example, frequency f7 and is moved to frequency f8, back to frequency f7, and to frequency f9, and back to frequency f7, and so on, illustrated by an arrow 410. The central wavelength of the carrier signal 402 may be sinusoidally varied with frequency f7 as a center. Because the data signals 404 are encoded with the carrier signal 402, their central wavelengths are also sinusoidally varied around frequency f7. The resonant frequency 406 of the receiver ring filter is shown to center at the frequency f7 without change.

In another implementation, a central wavelength of the carrier signal 402 can be varied with a control signal such as a ramp signal. For example, the control signal can move the central wavelength of the carrier signal 402 at different speeds. While the central wavelength of the carrier signal 402 may oscillate between frequencies f749, it spends less time at the center frequency f7 and more time at end frequencies f8 and f9. The central wavelength of the carrier signal 402 is moved at or around center frequency f7 at a speed greater than a speed at or around end frequencies f8 and f9. This can be achieved by a bimodal drive mechanism to minimize the time in the center (f7) and maximize time at the endpoints (f8 and f9) with an exponential-mode control algorithm. The bimodal drive mechanism may be refined with information of BER updates in the network. Other control algorithm may be adopted if it can achieve the above effects.

Figure 4B:
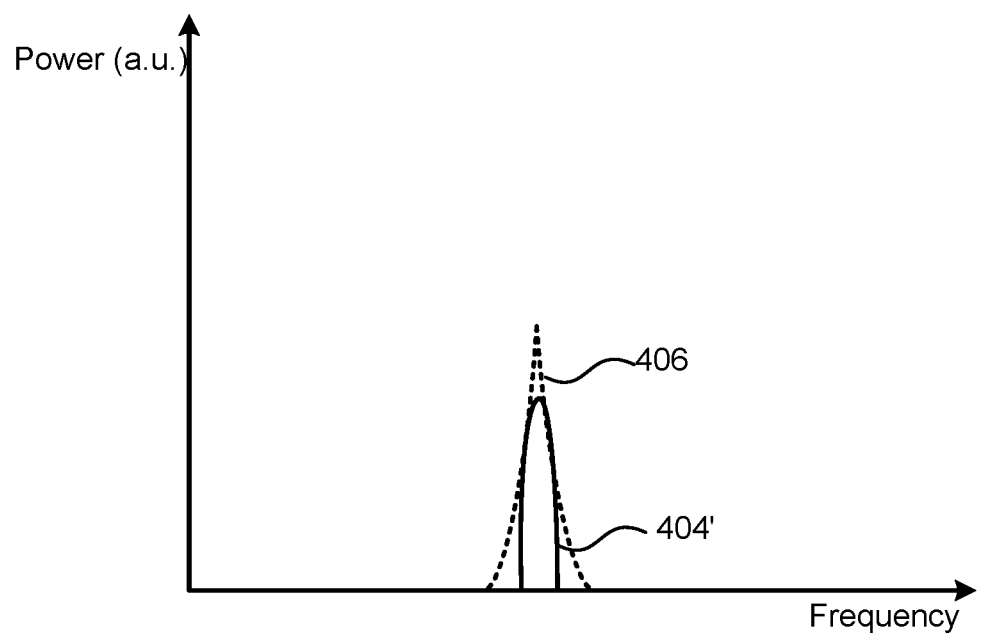
FIG. 4B is a diagram graphically illustrating spectral filtering of the optical communication network of FIG. 4A.

The final data signal 404' received at the receiver ring filter is shown in FIG. 4B. As compared to the attenuated data signals 204a', 204b' in FIG. 2B, the received data signal 404' has stronger power, which in turn can reduce the BER.

Figure 5A:
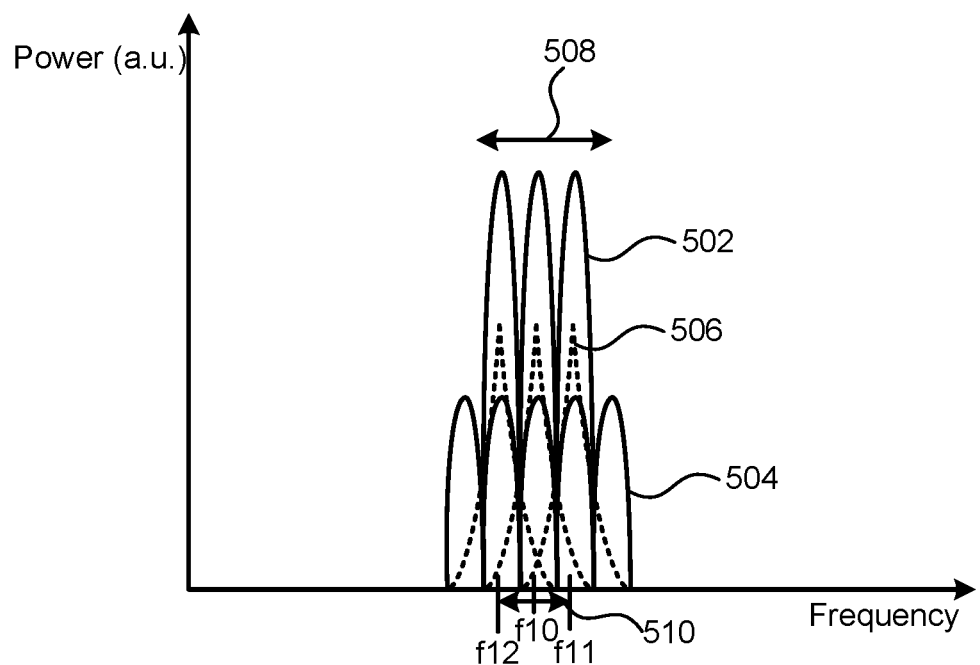
FIG. 5A is a diagram illustrating carrier and data signals (solid line) of a transmitter ring filter and resonant signals (broken line) of a receiver ring filter of yet another optical transceiving mechanism according to one example embodiment of this disclosure.

In some other implementations, a central wavelength of the resonant signal of the receiver ring filter and a central wavelength of the carrier signal of the transmitter ring filter may both be varied. An example is illustrated in FIG. 5A. In FIG. 5A, a central wavelength of the carrier signal 502 on the transmitter side is initially at frequency f10 and is moved to frequency 111, back to frequency f10, and to frequency f12, and back to frequency f10, and so on, illustrated by an arrow 508. The central wavelength of the carrier signal 502 may be sinusoidally varied around, for example, frequency f10. Because the data signals 504 are encoded with the carrier signal 502, the central wavelengths of the data signals 504 are also sinusoidally varied around frequency f10. The resonant frequency 506 of the receiver ring filter is also varied. For example, a central wavelength of resonant frequency 506 of the receiver ring filter may be moved from frequency f10 to frequency f11, back to frequency f10, and to frequency f12, and back to frequency f10, and so on, illustrated by an arrow 510. The frequencies for varying the central wavelengths of the carrier signal 502 and the resonant frequency 506 may be different and not synchronized to increase the chance that the data signals are modulated around the central wavelength of the receiver ring filter. In some embodiments, a controller connected to both the transmitter and the receiver may be provided to ensure that the central wavelengths of the carrier signal 502 and the resonant frequency 506 does not coincide with each other. For example, the central wavelengths of the carrier signal 502 and the resonant frequency 506 may be varied but kept away from each other at an offset.

As explained above, each of the central wavelengths of the carrier signal 502 and the resonant frequency 506 can be varied with a control signal such as a ramp signal. The control signal allows each of the central wavelengths of the carrier signal 502 and the resonant frequency 506 to be moved in different speeds. While the central wavelength of the carrier signal 502 may oscillate between frequencies f10-f12, it spends less time at the center frequency f10 and more time at end frequencies f11 and f12. The central wavelength of the carrier signal 502 is moved at or around center frequency f10 at a speed greater than a speed at or around end frequencies f11 and f12. Similarly, while the central wavelength of the resonant frequency 506 may oscillate between frequencies f10-f12, it spends less time at the center frequency f10 and more time at end frequencies f11 and f12. The central wavelength of the resonant frequency 506 is moved at or around center frequency f10 at a speed greater than a speed at or around end frequencies f11 and f12. This can be achieved by a bimodal drive mechanism to minimize the time in the center (f10) and maximize time at the endpoints (f11 and f12) with an exponential-mode control algorithm.

Figure 5B:
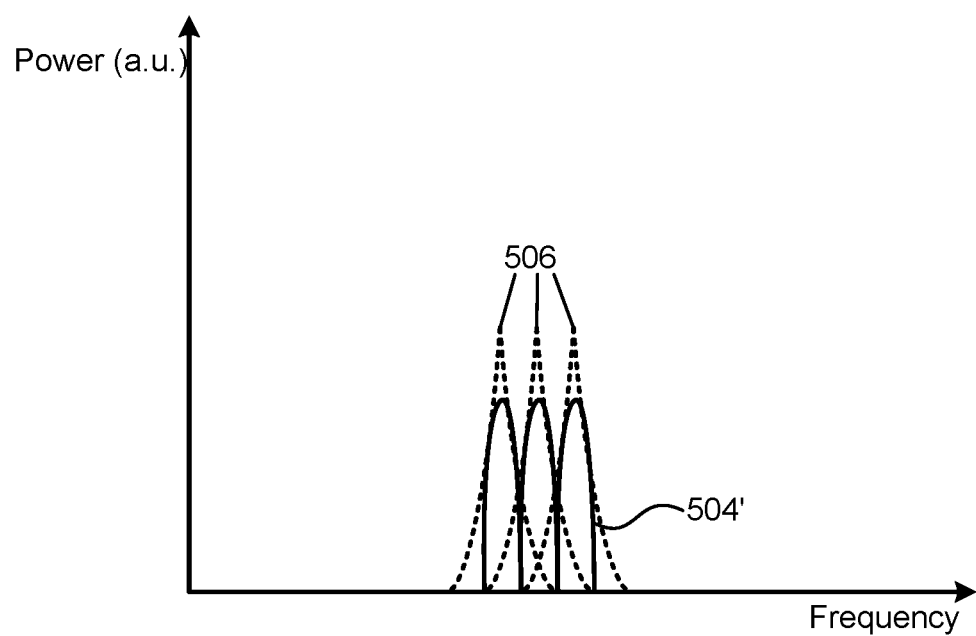
FIG. 5B is a diagram graphically illustrating spectral filtering of the optical communication network of FIG. 5A.

The final data signals 504' received at the receiver ring filter are shown in FIG. 5B. As compared to the attenuated data signals 204a', 204b' in FIG. 2B, the received data signals 504' have stronger power, which in turn can reduce the BER.

Figure 6:
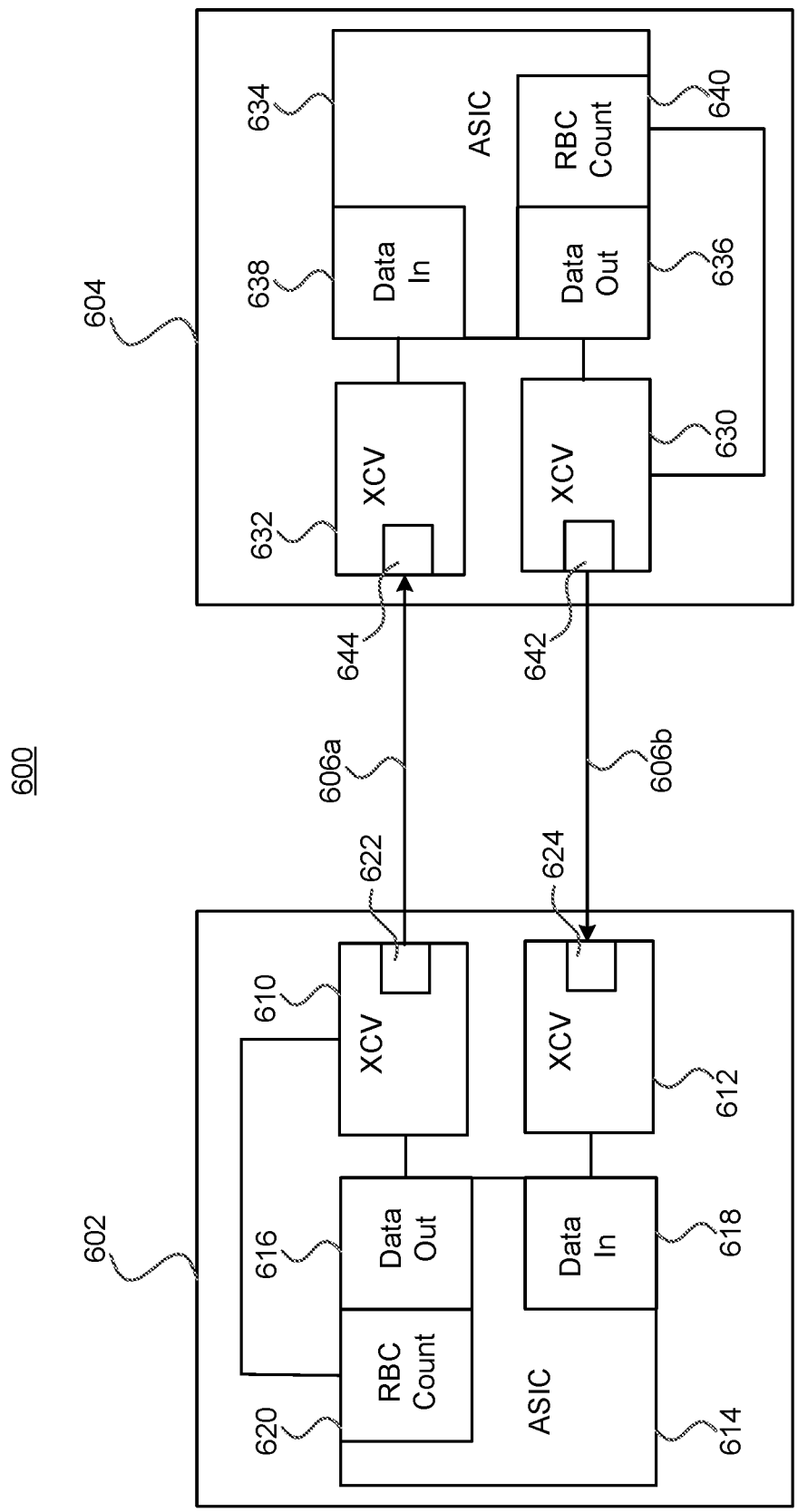
FIG. 6 is a block diagram illustrating another optical communication network configured to implement techniques for reducing bit error rates, according to one embodiment of this disclosure.

FIG. 6 is a block diagram illustrating another optical communication network 600 configured to implement the techniques disclosed herein, according to one embodiment. The optical communication network 600 includes a first node 602 and a second node 604. The first node 602 and the second node 604 are connected to each other through optical cables 606a, 606b. It should be understood that more nodes can be included in the optical communication network 600. Although shown as separate cables, the optical cables 606a, 606b may be combined as a single duplex cable.

The first node 602 includes transceivers (e.g., optical transceivers or optical transceiver modules "XCV") 610, 612 and an ASIC 614. The ASIC 614 includes a data output block (Data Out) 616, a data input (Data In) block 618, and an RBC Count block 620. The transceivers 610 and 612 include ring filters 622 and 624, respectively. The RBC Count block 620 is coupled to the transceiver 610 to control data output. The data output block 616 of the ASIC 614 is configured to generate electrical signals to be transmitted by the transceiver 610. The electrical signals are converted into optical signals at the transceiver 610 and transmitted through the ring filter 622 to the second node 604 via the optical cable 606a. In some embodiments, each of the transceivers 610, 612 may be implemented by silicon photonic technologies.

The transceiver 612 is configured to receive optical signals through the ring filter 624 and to convert the received optical signals into electrical signals for the ASIC 614. The data input block 618 of the ASIC 614 receives the electrical signals from the transceiver 612. The data input block 618 may send the electrical signals to other functional blocks of the ASIC 614 for processing. The RBC block 620 is configured to keep a count of data output. For example, the RBC block 620 may keep a rolling average of numbers of contiguous digital signals (1's or 0's) in a bitstream over a period of a predetermined bits (e.g., 1000 bits). The count may be used to determine a time or times to vary a central wavelength of the ring filter 622. For example, the central wavelength of the ring filter 622 may be varied each time the data output bit count reaches 1000 bits. Alternatively, a BER in the network 600 may be use to vary the central wavelength of the ring filter 622, which requires a feedback from node 604. When the ring count block 620 determines that it is time to vary central wavelength of the ring filter 622 or the BER is greater than a threshold, the RBC count block 620 is configured to generate and send a control signal to the transceiver 610 to vary a central wavelength of the ring filter 622. The central wavelength of the ring filter 622 may be varied periodically. The central wavelength of the ring filter 622 may be varied based on a data signal frequency of the data signals. In some embodiments, the central wavelength of the ring filter 622 may be varied at a frequency at least three orders slower than the data signal frequency.

Similarly, the second node 604 includes transceivers (e.g., optical transceivers or optical transceiver modules "XCV") 630, 632 and an ASIC 634. The ASIC 634 includes a data output block 636, a data input block 638, and an RBC Count block 640. The RBC Count block 640 is coupled to transceiver 630 to control data output. The transceivers 630 and 632 include ring filters 642 and 644, respectively. The data output block 636 of the ASIC 634 is configured to generate electrical signals to be transmitted by the transceiver 630. The electrical signals are converted into optical signals at the transceiver 630 and transmitted through the ring filter 642 to the first node 602 via the optical cable 606*b*. Each of the transceivers 630, 632 may be implemented by silicon photonic technologies.

The transceiver 632 is configured to receive optical signals through the ring filter 644 and to convert the received optical signals into electrical signals for the ASIC 634. The data input block 638 of the ASIC 634 receives the electrical signals from the transceiver 632. The data input block 638 may send the electrical signals to the RBC count block 640. The RBC block 640 is configured to keep a count of data output for the node 604. For example, the RBC block 640 may keep a rolling average of numbers of contiguous digital signals in a bitstream over a period of a predetermined bits (e.g., 1000 bits). The count may be used to determine a time or times to vary a central wavelength of the ring filter 642. For example, the central wavelength of the ring filter 642 may be varied each time the data output bit count reaches 1000 bits. Alternatively, a BER in the network 600 may be use to vary the central wavelength of the ring filter 642, which requires a feedback from the node 602. When the RBC count block 640 determines that it is time to vary central wavelength of the ring filter 642 or the BER is greater than a threshold, the RBC count block 640 is configured to generate and send a control signal to the transceiver 630 to vary a central wavelength of the ring filter 642. The central wavelength of the ring filter 642 may be varied periodically. The central wavelength of the ring filter 642 may be varied based on a data signal frequency of the transceiver 630. In some embodiments, the central wavelength of the ring filter 642 may be varied at a frequency at least three orders slower than the data signal frequency. The central wavelength of the ring filter 642 may be varied according to the control mechanism explained in connection with FIGS. 4A and 4B.

Figure 7:
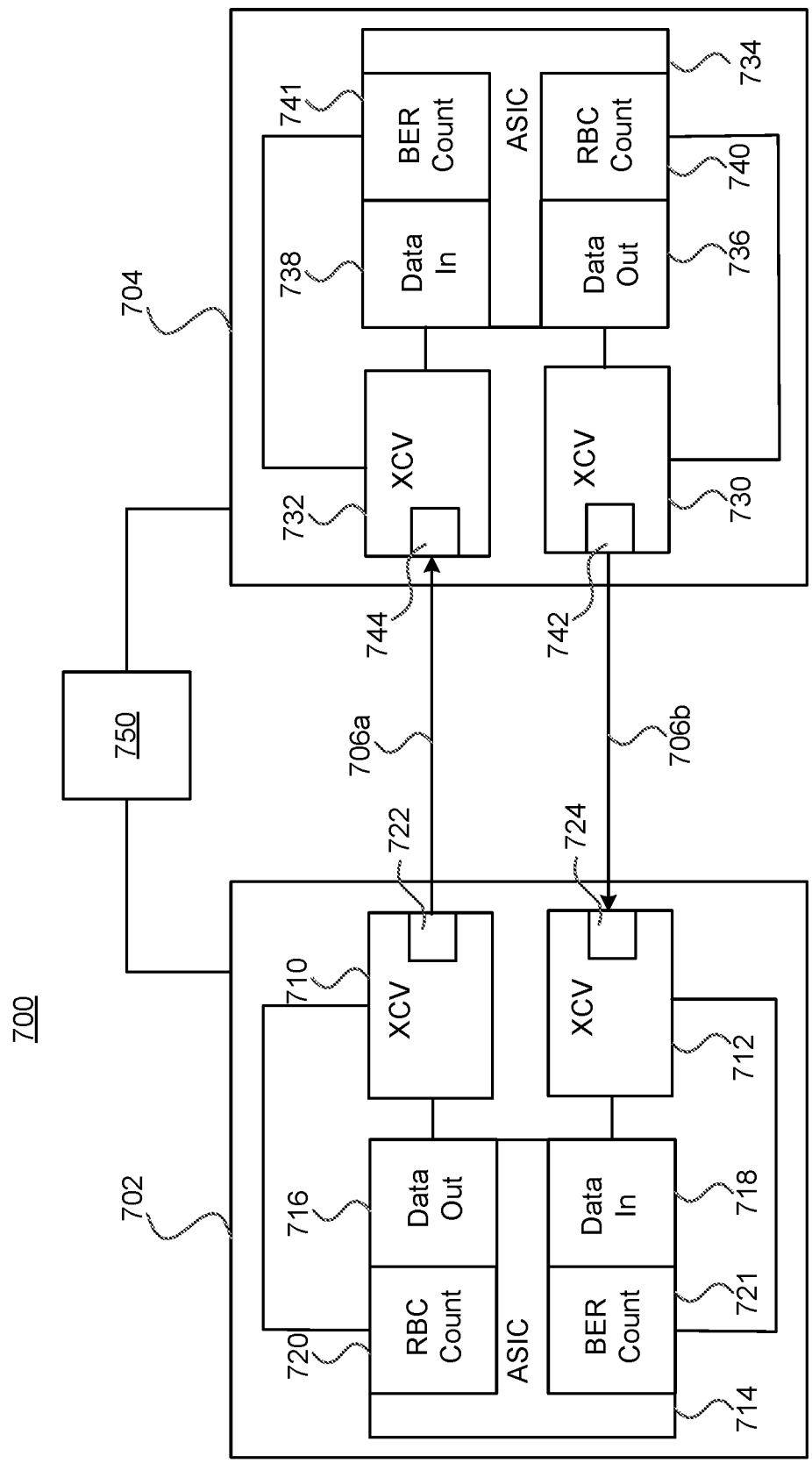
FIG. 7 is a block diagram illustrating yet another optical communication network configured to implement techniques for reducing bit error rates, according to one embodiment of this disclosure.

FIG. 7 is a block diagram illustrating another optical communication network 700 configured to implement the techniques disclosed herein for reducing BER, according to one embodiment. The optical communication network 700 includes a first node 702 and a second node 704. The first node 702 and the second node 704 are connected through optical cables 707*a*, 706*b*. It should be understood that more nodes may be included in the optical communication network 700. Although shown as separate cables, the optical cables 706*a*, 706*b* may be combined as a single duplex cable.

The first node 702 includes transceivers (e.g., optical transceivers or optical transceiver modules "XCV") 710, 712 and an ASIC 714. The ASIC 714 includes a data output block (Data Out) 716, a data input (Data In) block 718, an RBC Count block 720, and a BER Count block 721. The RBC Count block 720 is coupled to the transceiver 710 to control data output, while the BER Count block 721 is coupled to the transceiver 712 to control data input. The transceivers 710 and 712 include ring filters 722 and 724, respectively. The data output block 716 of the ASIC 714 is configured to generate electrical signals to be transmitted by the transceiver 710. The electrical signals are converted into optical signals at the transceiver 710 and transmitted through the ring filter 722 to the second node 704 via the optical cable 706*a*. In some embodiments, each of the transceivers 710, 712 may be implemented by silicon photonic technologies.

The RBC block 720 is configured to keep a count of data output for the node 702. For example, the RBC block 720 may keep a rolling average of numbers of contiguous digital signals (1's or 0's) in a bitstream over a period of a predetermined bits (e.g., 1000 bits). The count may be used to determine a time or times to vary a central wavelength of the ring filter 722. For example, the central wavelength of the ring filter 722 may be varied each time the data output bit count reaches 1000 bits. When the RBC count block 720 determines that it is time to vary central wavelength of the ring filter 722, the RBC count block 720 is configured to generate and send a control signal to the transceiver 710 to vary a central wavelength of the ring filter 722. The central wavelength of the ring filter 722 may be varied periodically. The central wavelength of the ring filter 722 may be varied based on a data signal frequency of the transceiver 710. In some embodiments, the central wavelength of the ring filter 722 may be varied at a frequency at least three orders slower than the data signal frequency.

The transceiver 712 is configured to receive optical signals through the ring filter 724 and to convert the received optical signals into electrical signals for the ASIC 714. The data input block 718 of the ASIC 714 receives the electrical signals from the transceiver 712. The data input block 718 may send the electrical signals to other functional blocks, e.g., the BER count block 721, of the ASIC 714 for processing. The BER block 721 is configured to determine a BER for the received signals based on data input at the data input block 718. When the BER is greater than a threshold, the BER count block 721 is configured to generate and send a control signal to the transceiver 712 to vary a central wavelength of the ring filter 724. For example, once the BER count block 721 determines that the BER of the incoming signals is greater than a threshold, the BER count block 721 may provide a control signal to the transceiver 712 to periodically vary a central wavelength of the ring filter 724. The central wavelength of the ring filter 724 may be varied based on a data signal frequency of incoming data signals. In some embodiments, the central wavelength of the ring filter 724 may be varied at a frequency at least three orders slower than the data signal frequency.

Similarly, the second node 704 includes transceivers (e.g., optical transceivers or optical transceiver modules "XCV") 730, 732 and an ASIC 734. The ASIC 734 includes a data output block 736, a data input block 738, an RBC Count block 740, and a BER Count block 741. The RBC Count block 740 is coupled to the transceiver 730 to control data output from the second node 704, while the BER Count block 741 is coupled to the transceiver 732 to control data input to the second node 704. The transceivers 730 and 732 include ring filters 742 and 744, respectively. The data output block 736 of the ASIC 734 is configured to generate electrical signals to be transmitted by the transceiver 730. The electrical signals are converted into optical signals at the transceiver 730 and transmitted through the ring filter 742 to the first node 702 via the optical cable 706*b*. In some embodiments, each of the transceivers 730 and 732 may be implemented by silicon photonic technologies.

The RBC block 740 is configured to keep a count of data output for the node 704. For example, the RBC block 740 may keep a rolling average of numbers of contiguous digital signals in a bitstream over a period of a predetermined bits (e.g., 1000 bits). The count may be used to determine a time or times to vary a central wavelength of the ring filter 742. For example, the central wavelength of the ring filter 742 may be varied each time the data output bit count reaches 1000 bits or other suitable bits. When the RBC count block 740 determines that it is time to vary central wavelength of the ring filter 742, the RBC count block 740 is configured to generate and send a control signal to the transceiver 730 to vary a central wavelength of the ring filter 742. The central wavelength of the ring filter 742 may be varied periodically. The central wavelength of the ring filter 742 may also be varied based on a data signal frequency of the transceiver 730. In some embodiments, the central wavelength of the ring filter 742 may be varied at a frequency at least three orders slower than the data signal frequency.

The transceiver 732 is configured to receive optical signals through the ring filter 744 and to convert the received optical signals into electrical signals for the ASIC 734. The data input block 738 of the ASIC 734 receives the electrical signals from the transceiver 732. The data input block 738 may send the electrical signals to other functional blocks, e.g., the BER count block 741, of the ASIC 734 for processing. The BER block 741 is configured to determine a BER for the received signals based on data input at the data input block 738. When the BER is greater than a threshold, the BER count block 741 is configured to generate and send a control signal to the transceiver 732 to vary a central wavelength of the ring filter 744. For example, once the BER count block 741 determines that the BER of the incoming signals is greater than a threshold, the BER count block 741 may provide a control signal to the transceiver 732 to periodically vary a central wavelength of the ring filter 744. The central wavelength of the ring filter 744 may be varied based on a data signal frequency of incoming data signals. In some embodiments, the central wavelength of the ring filter 744 may be varied at a frequency at least three orders slower than the data signal frequency. The central wavelengths of the ring filters 722, 724, 742, and 744 may be varied according to the control mechanism explained in connection with FIGS. 5A and 5B.

In some embodiments, the optical communication network 700 may further include a management server 750 to coordinate efforts to reduce BER. For example, the nodes 702 and 704 may exchange the BERs generated by the BER blocks 721 and 741 through the manage server 750 such that each of the nodes can use the feedback BERs at the receiver ends to vary the central wavelengths of the ring filters 722 and 742 at the transmitter ends.

Figure 8:
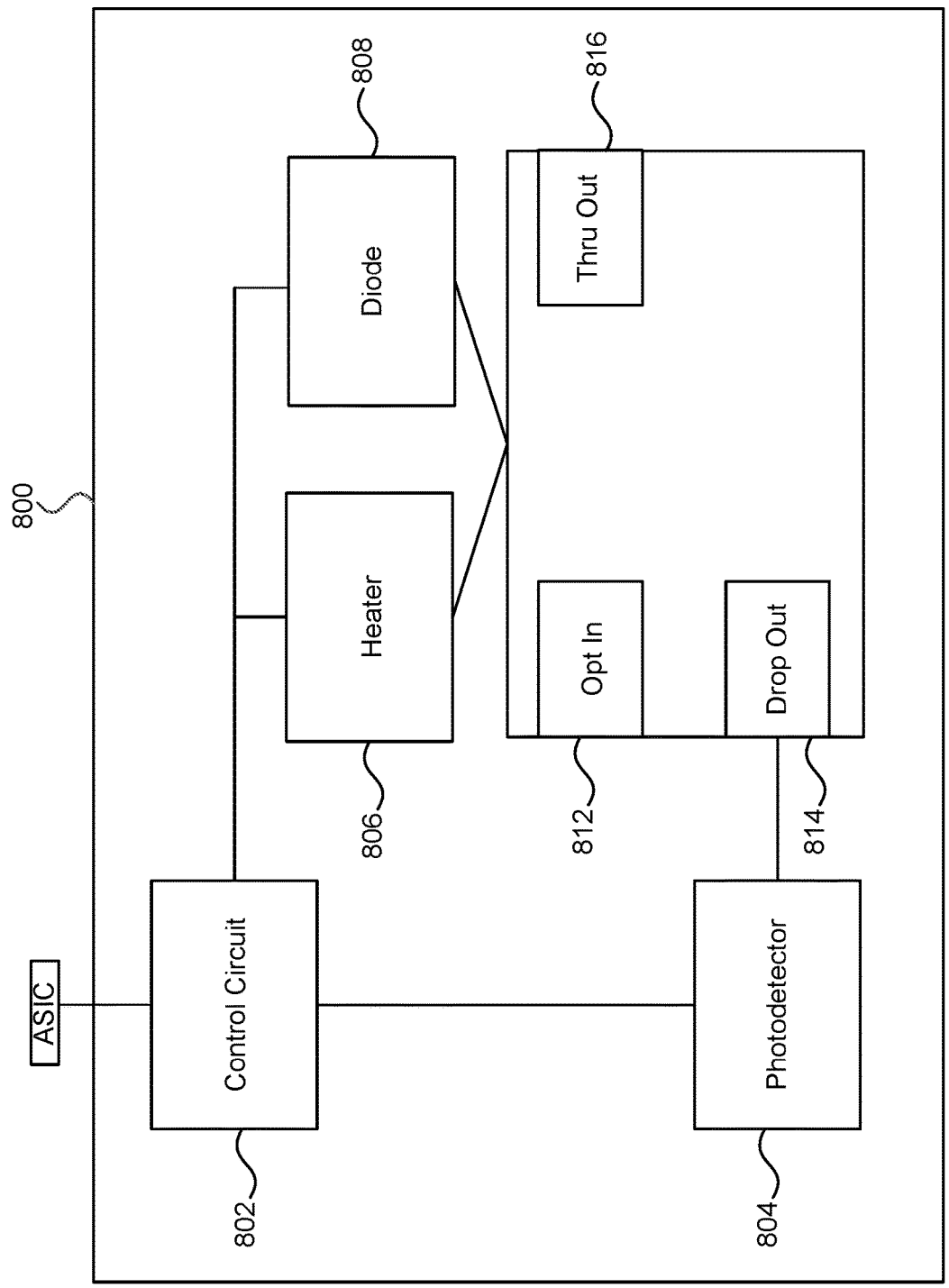
FIG. 8 is a block diagram of a ring filter according to one example embodiment of this disclosure.

FIG. 8 is a block diagram of a ring filter 800 according to one example embodiment. The ring filter 800 may be any one of the ring filters in FIGS. 1, 6, and 7. The ring filter 800 includes a control circuit 802, a photodetector 804, a heater 806, a diode 808, and a ring cavity 810. The control circuit 802 is coupled to a node ASIC (e.g., ASIC 114 or 134) to receive a control signal therefrom. Based on the control signal, the control circuit 802 is configured to generate one or more signals to vary a central wavelength of the ring cavity 810. For example, the control circuit 802 may generate a sinusoidal time-varying signal for one or both of the heater 806 and the diode 808 to vary the central wavelength of the ring cavity 810. The sinusoidal time-varying signal may periodically activate the heater 806 and/or the diode 808 to provide thermal effects or plasma effects on the ring cavity 810 such that the central wavelength of the ring cavity 810 is changed. The thermal effects or plasma effects may change a dielectric constant of a material of the ring cavity for varying the central wavelength of the ring cavity 810.

In some implementations, the control circuit 802 may generate an alternative time-varying signal for one or both of the heater 806 and the diode 808. The alternative time-varying signal may be a ramp signal. In one instance, the alternative time-varying signal can periodically move the central wavelength of the ring cavity 810 away from a carrier frequency by an offset. The alternative time-varying signal may also move the central wavelength of the ring cavity 810 at a first speed at the carrier frequency and at a second speed at the offset such that the first speed is greater than the second speed. This allows the resonant frequency to spend more time at the offset and less time at the carrier frequency, which may increase the power of the received signals as explained above.

The ring cavity 810 has an optical input port (Opt In) 812, an optical output port (Drop Out) 814, and a pass-through port (Thru Out) 816. The optical input port 812 is configured to receive input optical signals for the optical cavity 810. Optical signals designated for the ring filter 800 are filtered at the optical output port 814 and can be detected by the photodetector 804. In some embodiments, the photodetector 804 may be a photodiode. Optical signals designated for transit are filtered at pass-through port 816 to be transmitted to a destination.

In summary, the techniques disclosed herein help ameliorate the spectral filtering that is fundamental to optical links that use ring filters/resonators. As described above in connection with FIGS. 2A and 2B, when a static ring filter is used at the receiver or transmitter, attenuation of the optical sidebands causes deleterious effects on the high-speed optical signals. The disclosed techniques add back this frequency content is to slowly, with respect to the speed of the data signal, vary the wavelength of resonance for the receiver ring filter or the wavelength of carrier signals for the transmitter ring filter.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical transceiver module comprising:
an optical transceiver having a ring filter configured to transmit optical signals from or receive optical signals transmitted to the optical transceiver module; and
a controller configured to:
detect a carrier frequency at the optical transceiver;
detect a data signal frequency of data at the optical transceiver, the data signal frequency being less than the carrier frequency;
determine a bit error rate of the data; and
in response to determining that the bit error rate of the data is greater than a threshold, periodically vary a central wavelength of the ring filter at a frequency at least three orders slower than the data signal frequency.

2. The optical transceiver module of claim 1, further comprising:
a heater disposed at the ring filter, wherein the controller controls the heater to periodically vary the central wavelength of the ring filter.

3. The optical transceiver module of claim 2, wherein:
the heater is periodically heated to provide a thermal effect to vary the central wavelength of the ring filter.

4. The optical transceiver module of claim 1, further comprising:
a diode disposed at the ring filter, wherein the controller controls the diode to periodically vary the central wavelength of the ring filter.

5. The optical transceiver module of claim 4, wherein:
the diode is configured to provide a plasma effect to vary the central wavelength of the ring filter.

6. The optical transceiver module of claim 1, wherein the controller is configured to provide a sinusoidal time-varying signal to vary the central wavelength of the ring filter.

7. The optical transceiver module of claim 1, wherein the controller is configured to provide an alternative time-varying signal to vary the central wavelength of the ring filter.

8. The optical transceiver module of claim 7, wherein the alternative time-varying signal includes a ramp signal.

9. The optical transceiver module of claim 7, wherein the alternative time-varying signal periodically moves the central wavelength of the ring filter away from the carrier frequency by an offset.

10. The optical transceiver module of claim 9, wherein the alternative time-varying signal moves the central wavelength of the ring filter at a first speed at the carrier frequency and at a second speed at the offset, wherein the first speed is greater than the second speed.

11. An optical communication network comprising:
an optical transmitter;
an optical receiver; and
one or more optical cables connected between the optical transmitter and the optical receiver, wherein each of the optical transmitter and the optical receiver includes:
a ring filter; and
a controller configured to:
detect a carrier frequency at the optical transmitter or the optical receiver;
detect a data signal frequency of data at the optical transmitter or the optical receiver, the data signal frequency being less than the carrier frequency;
determine a bit error rate of the data; and
in response to determining that the bit error rate of the data is greater than a threshold, periodically vary a central wavelength of the ring filter at a frequency at least three orders slower than the data signal frequency.

12. The optical communication network of claim 11, further comprising:
a heater disposed at the ring filter, wherein the controller controls the heater to periodically vary the central wavelength of the ring filter.

13. The optical communication network of claim 12, wherein:
the heater is periodically heated to provide a thermal effect to vary the central wavelength of the ring filter.

14. The optical communication network of claim 11, further comprising:
a diode disposed at the ring filter, wherein the controller controls the diode to periodically vary the central wavelength of the ring filter.

15. The optical communication network of claim 14, wherein:

the diode is configured to provide a plasma effect to vary the central wavelength of the ring filter.

16. The optical communication network of claim 11, wherein the controller is configured to provide a sinusoidal time-varying signal to vary the central wavelength of the ring filter.

17. The optical communication network of claim 11, wherein the controller is configured to provide an alternative time-varying signal to vary the central wavelength of the ring filter.

18. The optical communication network of claim 17, wherein the alternative time-varying signal includes a ramp signal.

19. The optical communication network of claim 17, wherein the alternative time-varying signal periodically moves the central wavelength of the ring filter away from the carrier frequency by an offset.

20. The optical communication network of claim 19, wherein the alternative time-varying signal moves the central wavelength of the ring filter at a first speed at the carrier frequency and at a second speed at the offset, wherein the first speed is greater than the second speed.

* * * * *